United States Patent [19]

Beck et al.

[11] Patent Number: 5,567,233
[45] Date of Patent: Oct. 22, 1996

[54] PROCESS FOR PREPARING BALLPOINT PEN PASTES WITH COLORED METAL OXIDE PIGMENTS

[75] Inventors: Karin H. Beck; Helmut Bellaire, both of Ludwigshafen; Claudius Kormann, Schifferstadt; Rainer Dyllick-Brenzinger, Weinheim, all of Germany

[73] Assignee: BASF Aktiengesellschaft, Ludwigshafen, Germany

[21] Appl. No.: 476,580

[22] Filed: Jun. 7, 1995

[30] Foreign Application Priority Data

Jun. 14, 1994 [DE] Germany ................... 44 20 644.5

[51] Int. Cl.$^6$ .................................. C09D 11/18
[52] U.S. Cl. .............. 106/20 R; 106/20 B; 106/460
[58] Field of Search ................... 106/20 R, 20 B, 106/460; 252/62.56

[56] References Cited

U.S. PATENT DOCUMENTS

| | | | |
|---|---|---|---|
| 4,604,139 | 8/1986 | Shioi et al. | 106/22 C |
| 4,758,275 | 7/1988 | Yubakami et al. | 106/20 B |
| 4,810,401 | 3/1989 | Mair et al. | 252/62.55 |

FOREIGN PATENT DOCUMENTS

| | | |
|---|---|---|
| 2505727 | 8/1976 | Germany . |
| 3203782 | 8/1983 | Germany . |

OTHER PUBLICATIONS

Database WPI, Derwent Puplications, AN-78-08903A JP-52-150 135 Dec. 13, 1977.

*Primary Examiner*—Helene Klemanski
*Attorney, Agent, or Firm*—Oblon, Spivak, McClelland, Maier & Neustadt, P.C.

[57] ABSTRACT

Ballpoint pen pastes are prepared comprising at least one colored metal oxide pigment and customary ballpoint pen paste resin and organic solvent as essential components and also, if desired, further customary additives.

16 Claims, No Drawings

PROCESS FOR PREPARING BALLPOINT PEN PASTES WITH COLORED METAL OXIDE PIGMENTS

The present invention relates to novel ballpoint pen pastes comprising at least one colored metal oxide pigment and customary ballpoint pen paste resin and organic solvent as essential components and also, if desired, further customary additives.

The invention further relates to the preparation of these ballpoint pen pastes.

Ballpoint pen pastes are customarily solutions of dyes in high boiling solvents to which resins are added to improve the fastness properties and to set the required viscosity (typically from 7 to 20 Pa.s), and are essentially water-free.

However, the known ballpoint pen pastes are not satisfactory in various respects. In particular, their document fastness frequently leaves something to be desired.

It is an object of the present invention to provide document-fast ballpoint pen pastes which have good application properties.

We have found that this object is achieved by the above-defined ballpoint pen pastes.

We have also found a process for preparing the ballpoint pen pastes, which comprises kneading the metal oxide pigment, present as a suspension in water or an organic solvent or in the form of a water- or solvent-containing presscake, into the resin at elevated temperature, subsequently removing the water or solvent by further increasing the temperature, and then grinding the cooled pigment-resin preparation and dissolving it in the organic solvent used for the final ballpoint pen paste while, if desired, adding further additives.

The colored metal oxide pigments in the ballpoint pen pastes of the invention generally have particle sizes of <1 μm, preferably from 5 to 500 nm, particularly preferably from 5 to 100 nm. Their specific surface area (BET) is generally from 3 to 300 $m^2/g$. The particle size is customarily determined by electron microscopy or X-ray diffraction.

They are advantageously insoluble in water and in organic solvents; ie. their solubility is less than 0.5 g/kg of solvent phase.

Examples of suitable metal oxide pigments include in addition to manganese dioxide $MnO_2$ in particular iron oxides not only in pure but also in doped form (as mixed phase). Suitable are specifically iron(III) oxide $Fe_2O_3$ and in particular also the superparamagnetic oxides magnetite $Fe_3O_4$ and the mixed oxides of the formula $M_vMn_w Zn_xFe_yO_z$ (M: Co and/or Ni; v,w: 0–0.998; x: 0.001–0.998; y: 2.001–2.998; z: 3.001–4; v+w+x: 0.002–0.999; v+w+x+y: 3; v≠0, when w=0, and w≠0, when v=0) described in U.S. Pat. No. 4,810,401, particularly $Mn_{0.2}Zn_{0.3}Fe_{2.5}O_4$.

The metal oxide pigments are known and partly commercially available or preparable by known methods.

The ballpoint pen pastes of the invention generally contain from 3 to 30, preferably from 10 to 15%, by weight of metal oxide pigment.

A further essential constituent of the ballpoint pen pastes is the resin, which functions to set the desired viscosity, which is generally from 7 to 20 Pa.s, preferably from 8 to 15 Pa.s, particularly preferably from 10 to 13 Pa.s.

Any resin customary for such purposes can be used. Exemplary are in particular acid phthalate resins, neutral aldehyde resins and neutral ketone resins, which are obtainable for example under the names of Phthalopal®NP (BASF), Kunstharze SK (Hüls) and Alnovol®PN 320 (Hoechst).

Also suitable are for example mixtures of neutral resins which have polar groups such as hydroxyl groups and contain from 33 to 66% by weight, based on the neutral resins, of acid resins, in which case preference is given to those mixtures in which the neutral portion predominates.

The resin content of the ballpoint pen pastes of the invention is customarily from 15 to 45, preferably from 20 to 40%, by weight.

Organic solvents suitable for the ballpoint pen pastes of the invention are likewise compounds known for this purpose. Suitable are specifically:

alcohols: eg. tridecanol, isotridecanol, in particular benzyl alcohol;

ether alcohols: eg. glycol ethers such as 2-methoxy-, 2-ethoxy-, 2-propoxy-, 2-isopropoxy-, 2-butoxy-, in particular 2-phenoxy-ethanol, also 2- and 3-methoxy-, 2- and 3-ethoxy-, 2- and 3-propoxy-, 2- and 3-isopropoxy-, 2- and 3-butoxy- and 2- and 3-phenoxy-propanol;

diethers: eg. 1,2-dimethoxy-, 1,2-diethoxy-, 1,2-dipropoxy-, 1,2-diisopropoxy-, 1,2-dibutoxy- and 1,2-diphenoxy-ethane, 1,2- and 1,3-dimethoxy-, 1,2- and 1,3-diethoxy-, 1,2- and 1,3-dipropoxy-, 1,2- and 1,3-diisopropoxy- and 1,2- and 1,3-diphenoxy-propane;

aliphatic carboxylic acids such as in particular olein; ie., technical grade oleic acid which is formed in the acid hydrolysis of fats and which may contain small amounts of stearic acid, palmitic acid and other fatty acids;

aromatic carboxylic esters: eg. di($C_4$-$C_{13}$-alkyl) esters of phthalic acid such asidibutyl, diisobutyl, di-sec-butyl, dipentyl, diisopentyl, dihexyl, diheptyl, in particular dioctyl, diisooctyl and bis(2-ethylhexyl), also dinonyl, diisononyl, didecyl, diisodecyl, diundecyl, didodecyl, ditridecyl and diisotridecyl phthalate;

hydrocarbons: eg. $C_5$-$C_{30}$-chloroalkanes such as chloroeicosane and chlorotetracosane; $C_1$-$C_{20}$-alkanes with two phenyl substituents, such as diphenyldecane and diphenyltetradecane; di($C_1$-$C_{10}$-alkyl)naphthalenes such as diisopropylnaphthalene; partially hydrogenated terphenyls.

It is of course also possible to use mixtures of these solvents (eg. benzyl alcohol-phenylglycol mixtures).

Generally, the ballpoint pen pastes of the invention contain from 40 to 60, preferably from 45 to 55%, by weight of organic solvent.

Furthermore, the ballpoint pen pastes of the invention may include organic dyes or dye mixtures dissolved in organic solvent for achieving a desired hue (in particular black).

Examples of suitable dyes are mixtures of C.I. Solvent Violet 8, C.I. Solvent Blue 4 and C.I. Solvent Black 5, of C.I. Solvent Violet 8 and C.I. Solvent Blue 64, of C.I. Solvent Violet 8, C.I. Solvent Blue 4 and C.I. Solvent Red 49 or mixtures of metanil yellow acid and crystal violet base.

Suitable additions of these dyes are advantageously from 1 to 20% by weight, based on the ready-prepared ballpoint pen paste.

The novel ballpoint pen pastes can be prepared with advantage by the process of the invention by first incorporating the pigment into the resin and, after a comminuting step, admixing the pigment-resin preparation obtained with the organic solvent.

Advantageously this is done as follows. The resin is first kneaded alone at elevated temperature (from about 80° to 100° C.) for about 10–15 min and then the metal oxide pigment, suspended in water or an organic solvent such as an alcohol or in the form of a water- or solvent-containing presscake (generally from 60 to 90% strength by weight), is added a little at a time over about 30 min. The mixture is then kneaded at elevated temperature (from about 110° to 130° C.) for about 1–2 h in order that the liquid phase may be removed. Then kneading is continued for some time (customarily from 30 to 60 min) at the original temperature in order that a uniform dispersion of the pigment in the resin may be achieved.

After cooling, the solidified preparation is ground to an average particle size of from about 100 to 200 μm. Suitable for this purpose is for example a laboratory mill.

The millbase is then dissolved in organic solvents customary for ballpoint pen pastes with the addition, if desired, of further additives, especially, for example, the abovementioned dye solutions.

The ballpoint pen pastes of the invention are notable for advantageous application properties, especially document fastness and storage stability.

EXAMPLES

Preparation of ballpoint pen pastes according to the invention

Example 1

225.0 g of a commercial acid phthalate resin (acid number 80) were kneaded at 90° C. for 15 min. Then 58.1 g of magnetite of particle size 8–25 nm (in the form of a 43% strength by weight suspension in water) were added a little at a time. With continued kneading the temperature was raised to 130° C. for 1 h to remove the water. Kneading was then continued at 90° C. for 1 h.

After cooling down to room temperature, the preparation obtained was ground in a laboratory mill for 10 min.

50 g of the preparation thus obtained were then dissolved in 50 g of 1:1 w/w 2-phenoxyethanol/benzyl alcohol.

The solution obtained was then mixed with the following dye solutions: 0.2 g of C.I. Solvent Violet 8 (25% strength by weight in olein), 0.1 g of C.I. Solvent Blue. 4 (25% strength by weight in olein) and 0.1 g of C.I. Solvent Red 49 (20% strength by weight in olein).

The ballpoint pen paste obtained was storage-stable, document fast and black.

Example 2

Example 1 was repeated except that 0.4 g of a mixture of 48% by weight of metanil yellow acid and 52% by weight of crystal violet base were added for shading.

Again a document-fast black ballpoint pen paste was obtained.

Example 3

Example 1 was repeated using 225.0 g of a neutral ketone resin (acid number 0).

A document-fast black ballpoint pen paste was obtained.

Example 4

Example 1 was repeated with 225.0 g of a neutral aldehyde resin (acid number <3).

A document-fast black ballpoint pen paste was obtained.

We claim:

1. A process for preparing ballpoint pen pastes comprising at least one colored metal oxide pigment and customary ballpoint pen paste resin and organic solvent as essential components and also, if desired, further customary additives, which comprises kneading the metal oxide pigment, present as a suspension in water or an organic solvent or in the form of a water- or solvent-containing presscake, into the resin at elevated temperature, subsequently removing the water or solvent by further increasing the temperature, and then grinding the cooled pigment-resin preparation and dissolving it in the organic solvent used for the final ballpoint pen paste while, if desired, adding further additives.

2. The process as claimed in claim 1, wherein the metal oxide pigment has particle sizes of <1 μm.

3. The process as claimed in claim 1, wherein the metal oxide pigment has particle sizes from 5 to 500 nm.

4. The process as claimed in claim 1, wherein the metal oxide pigment is an iron oxide.

5. The process as claimed in claim 1, wherein the metal oxide pigment is a superparamagnetic iron oxide.

6. The process as claimed in claim 1, wherein the metal oxide pigment is magnetite.

7. The process as claimed in claim 1, additionally comprising adding organic dyes for achieving a desired hue.

8. The process as claimed in claim 1, wherein the final ball-point pen paste has a viscosity from 7 to 20 Pa.s.

9. The process according to claim 1, wherein the final ballpoint pen paste contains from 3 to 30% by weight metal oxide pigment, from 15 to 45% by weight of resin and 40 to 60% by weight solvent, based on its total weight.

10. The process according to claim 1, wherein the metal oxide pigment is $MnO_2$.

11. The process according to claim 1, wherein the oxide pigment is $Fe_2O_3$.

12. The process according to claim 1, wherein the oxide pigment is a mixed oxide of the formula $M_v Mn_w Zn_x Fe_y O_z$ wherein M: Co and/or Ni; v,w: 0–0.998; x: 0.001–0.998; y: 2.001–2.998; z: 3.001–4; v+w+x: 0.002–0.999; v+w+x+y: 3; v≠0, when w=0, and w≠0, when v=0.

13. The process according to claim 12, wherein the oxide pigment is $Mn_{0.2}Zn_{0.3}Fe_{2.5}O_4$.

14. The process according to claim 1, wherein said elevated temperature is from about 80° to 100° C. and said further increasing temperature is from about 110° to 130° C.

15. The process according to claim 1, wherein the viscosity of the final ballpoint pen paste is from 8 to 15 Pa.s.

16. The process according to claim 1 wherein the viscosity of the final ballpoint pen paste is from 10 to 13 Pa.s.

* * * * *